United States Patent
Sipko et al.

(10) Patent No.: US 10,317,216 B1
(45) Date of Patent: Jun. 11, 2019

(54) OBJECT AND LOCATION TRACKING WITH A GRAPH-OF-GRAPHS

(71) Applicant: Microsoft Technology Licensing, LLC, Redmond, WA (US)

(72) Inventors: Jeffrey Sipko, Kirkland, WA (US); Kendall Clark York, Bellevue, WA (US); John Benjamin Hesketh, Kirkland, WA (US); Hubert Van Hoof, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/923,761

(22) Filed: Mar. 16, 2018

(51) Int. Cl.
| | | |
|---|---|---|
| *G01C 21/20* | (2006.01) | |
| *H04W 4/38* | (2018.01) | |
| *H04W 4/33* | (2018.01) | |
| *H04W 4/80* | (2018.01) | |
| *G06F 17/30* | (2006.01) | |

(52) U.S. Cl.
CPC ..... *G01C 21/206* (2013.01); *G06F 17/30241* (2013.01); *H04W 4/33* (2018.02); *H04W 4/38* (2018.02); *H04W 4/80* (2018.02)

(58) Field of Classification Search
CPC ........ G01C 21/206; H04W 4/38; H04W 4/33; H04W 4/80
USPC .................................................. 340/539.12
See application file for complete search history.

(56) References Cited

U.S. PATENT DOCUMENTS

| | | | |
|---|---|---|---|
| 8,370,421 B2 | 2/2013 | Gennari et al. | |
| 8,774,829 B2* | 7/2014 | Farley | G01S 5/0036 |
| | | | 455/456.1 |
| 9,013,282 B2 | 4/2015 | Li et al. | |
| 9,460,350 B2* | 10/2016 | Cook | G06K 9/00771 |
| 2009/0201850 A1* | 8/2009 | Davis | G01S 5/0009 |
| | | | 370/328 |
| 2015/0382084 A1 | 12/2015 | Gallo et al. | |
| 2016/0063005 A1 | 3/2016 | Sisbot et al. | |

(Continued)

FOREIGN PATENT DOCUMENTS

JP    2008-211781 A    9/2008

OTHER PUBLICATIONS

Kung, et al., "Efficient Location Tracking Using Sensor Networks," In Proceedings of IEEE Wireless Communications and Networking Conference (Mar. 16, 2003) (8 pages total).

*Primary Examiner* — Eric Blount
(74) *Attorney, Agent, or Firm* — Mark K. Young; Mayer & Williams PC

(57) ABSTRACT

A wearable device is configured with various sensory devices that recurrently monitor and gather data for a physical environment surrounding a user to help locate and track real-world objects. The various heterogeneous sensory devices digitize objects and the physical world. Each sensory device is configured with a threshold data change, in which, when the data picked up by one or more sensory devices surpasses the threshold, a query is performed on each sensor graph or sensory device. The queried sensor graph data is stored within a node in a spatial graph, in which nodes are connected to each other using edges to create spatial relationships between objects and spaces. Objects can be uploaded into an object graph associated with the spatial graph, in which the objects are digitized with each of the available sensors. This digital information can be subsequently used to, for example, locate the object.

20 Claims, 17 Drawing Sheets

(56) References Cited

U.S. PATENT DOCUMENTS

2017/0074665 A1* 3/2017 Trigoni .............. G06K 9/00476
2017/0300973 A1 10/2017 Jones et al.

* cited by examiner

200

1300

1400

1500

OBJECT AND LOCATION TRACKING WITH A GRAPH-OF-GRAPHS

BACKGROUND

Indoor positioning systems (IPSs) are utilized to track an object's location within a physical environment like an office building, shopping mall, or warehouse. IPSs can include, for example, using radio frequency identification devices (RFIDs) to track objects, and triangulating a user's location based on a computing device's signal strength to network devices such as Wi-Fi access points or Bluetooth beacons. Various sensors and other technologies can also be used for object tracking, indoor tracking, such as pedestrian dead reckoning (PDR), cameras, and global positioning systems (GPS). Respective IPSs have characteristics that are advantageous for certain scenarios, and likewise have characteristics that are disadvantageous for other scenarios.

SUMMARY

A spatial graph instantiated on a wearable device, remote server, or edge compute unit periodically queries all available sensors associated with a sensory device to establish nodes for each query, synthesizes the data queried from each sensor, and uses the data to track objects within a physical environment. Multiple sensory devices associated with the wearable device are used within a physical environment and are constantly switched on to collect data for the environment and develop sensor graphs. The sensors and implemented technologies can include a thermometer, GPS, accelerometer, inertial measurement unit (IMU), gyroscope, microphone, camera, Wi-Fi, etc. Each node on the spatial graph represents a collection of the sensor graphs pulled from each sensor upon creation of the node. Each node is then spatially linked using edges, thus creating a spatial print chain. Objects within the physical environment can be tracked using the data within the nodes. For example, the camera can recognize a user's baseball glove and a microphone can recognize the clinging sound of car keys. The baseball glove and the car keys can each be logged within one or more nodes of the spatial graph, which allows the user to subsequently locate each object upon querying the computing device which stores the spatial graph.

There are two scenarios in which the wearable device, remote server, or edge compute unit performs spatial prints which associate sensor graph data with a newly created node. One scenario is when data for one or more sensor graphs change beyond a threshold level and the second scenario is when a user uploads an object to the object graph. In both situations, the various sensor graphs and sensory devices are queried, which creates a digital copy of the user's environment and objects.

The remote server or an edge compute unit may be configured to link two different spatial print chains, which are comprised of a series of nodes and edges. For example, a first spatial print chain may have been previously uploaded, and a second spatial print chain may have been recently scanned and uploaded. An online linker, which operates while the wearable device is in an online state with the edge compute unit or remote server, may look for relationships between the two chains and connect the two chains to create a logical and traceable series of nodes. For example, while the wearable device is online, operating, and transmitting sensor data to the edge compute unit, the edge compute unit may look for connections among spatial print chains to create organic connections among chains (e.g., such as by finding connections between nodes of two separate chains). The online linker may operate locally at the wearable device or edge compute unit, remotely at the remote server, or a combination of the components. In addition, an offline linker may be utilized if there are no clear connections or relationships between spatial print chains. The offline linker may access previously uploaded spatial print chains on the remote server, and look for similarities, relationships, or connections to connect the two chains.

Over time, data in the remote server may go stale. For example, data can be stale when its old, contains too large of a file size, is irrelevant, or is deemed unnecessary by a user. In these situations, a garbage collector on the remote server may periodically search for and delete such data to save storage capacity.

Advantageously, the wearable device, edge compute unit, and remote server provide a system in which heterogenous data are recurrently collected for a physical environment and gathered into a spatial graph. The spatial graph provides a representation of real-world objects and locations and digitizes real-world objects using a collection of various sensor data. Additionally, data can be synthesized to identify objects and make logical connections as to an object's location within the real world. For example, the remote server may be configured to recognize real-world objects and make inferences as to where an object is located within a physical environment. The nodes and edges provide a conceptual and spatial relationship that correlates to the physical world and can thereby provide actual or approximate locations for items when absolute location is unavailable.

In that regard, the present configuration of an indoor positioning system (IPS) resolves problems present in other technologies, such as GPS, which may not be very useful when a user is indoors. The configuration of the spatial graph, nodes, and edges can either supplement GPS technologies or replace them altogether when the user is indoors to provide accurate location and object tracking. Additionally, the configuration can improve other IPS technologies where at times certain sensory data is not available, in which querying all sensor graphs for respective nodes provides significant useful data for object tracking and location technologies to utilize.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
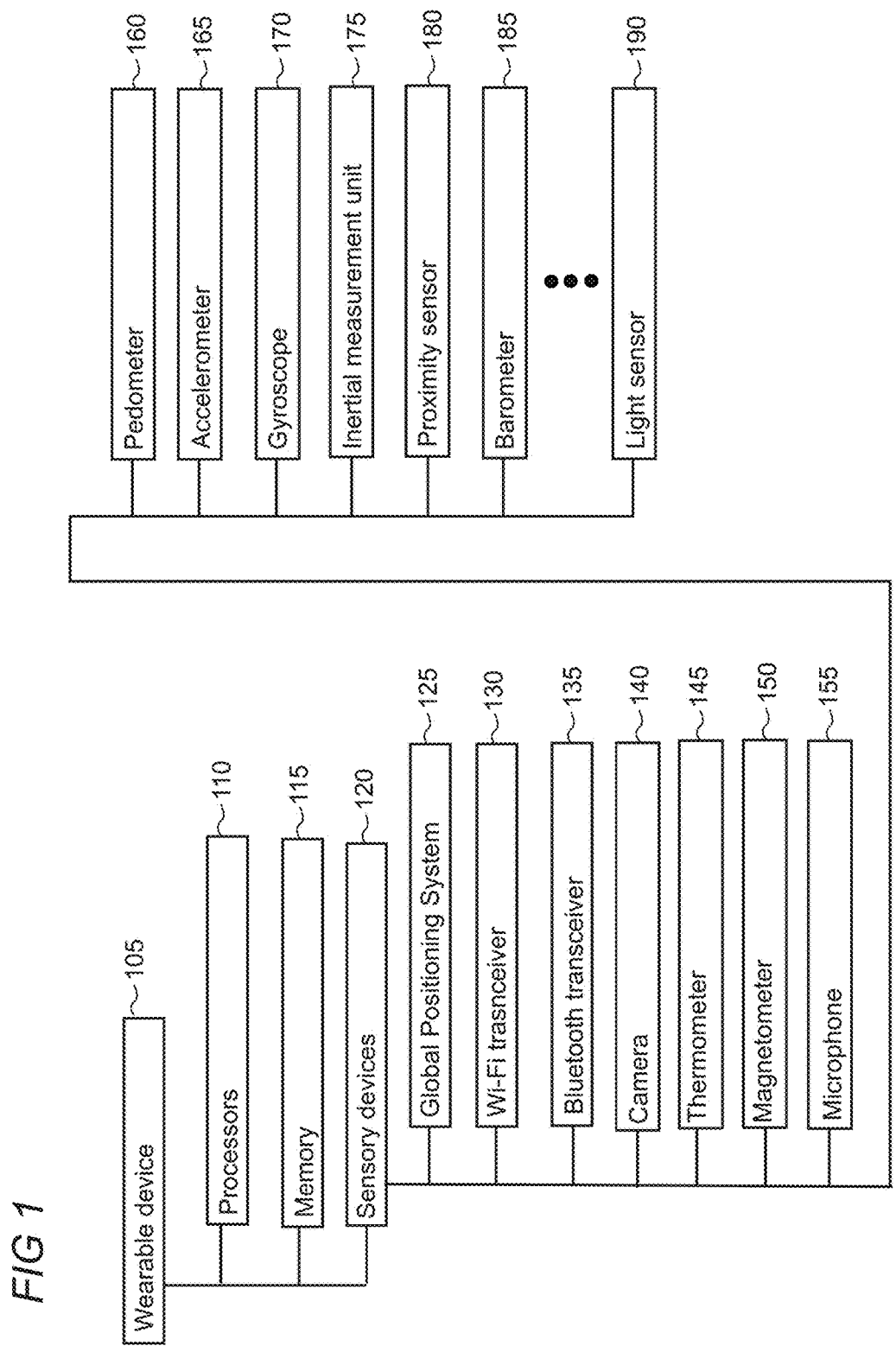
FIG. 1 shows illustrative components associated with a wearable device.

FIG. 1 shows illustrative hardware components associated with a wearable device 105. The wearable device 105 may include one or more of a variety of different computing devices that are configured to be readily and conveniently worn by the user to enable various functionalities and provide beneficial user experiences.

Various types of user interfaces may be utilized by the wearable device 105 including displays and inputs systems. Some wearable devices may be operated through voice interaction and sensed gestures and/or user activity. Wearable devices may be configured to operate continuously in a non-intrusive manner and may also support functionalities and user experiences that rely on explicit user interactions or other user inputs. The wearable device may be further configured with communication and networking interfaces to enable it to interact with either or both local and remote users, devices, systems, services, and resources.

The wearable device 105 is configured to include various sensors, as described below, that may be configured to detect and/or measure motion, light, surfaces, temperature, humidity, location, altitude, and other parameters that are descriptive of the user or device environment. Other sensors may be supported on the wearable device which are positioned directly or indirectly on the user's body to monitor parameters that are descriptive of the user's physiological state such as movement, body and/or body part position or pose, pulse, skin temperature, and the like. The sensors may be operated in various combinations so that a given descriptive parameter may, in some cases, be derived by suitable systems in the wearable device using data from more than one sensor, or by combining sensor data with other information that is available to the device.

The hardware components for the wearable device depicted in FIG. 1 is non-exhaustive and is used to show the various sensors which can generate graphs of data and be incorporated into a spatial graph, as discussed in further detail below. The aggregation of the heterogenous sensors implemented help develop a complete digital profile for an object or a physical environment. The wearable device includes a processors 110, memory 115, and numerous sensory devices (i.e., sensors) 120. The wearable or computing device employed, however, may use more or less of the sensory devices listed in FIG. 1. The sensory devices can include a Global Positioning System (GPS) 125, Wi-Fi transceiver 130, Bluetooth® transceiver 135, camera 140, thermometer 145, magnetometer 150, microphone 155, pedometer 160, accelerometer 165, gyroscope 170, Inertial Measurement Unit (IMU) 175, proximity sensory 180, barometer 185, and light sensor 190.

Figure 2:
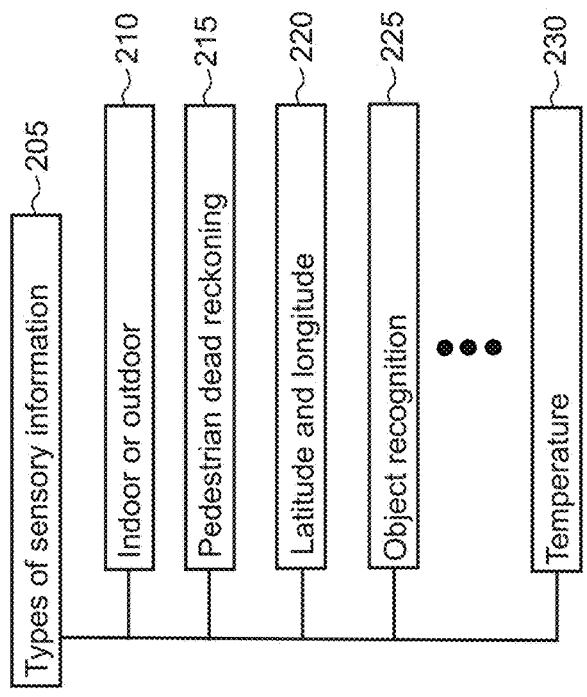
FIG. 2 shows illustrative sensory information obtained from one or more of the sensory devices in FIG. 1.

FIG. 2 shows illustrative types of sensory information 205 in which the wearable device or an external computing device (e.g., edge compute unit or remote server) derives based on data obtained from the sensory devices 120. For example, by synthesizing the data obtained from one or more sensors it can be determined whether the wearable device is located inside or outside 210. In addition, pedestrian dead reckoning (PDR) 215 principles can be utilized to obtain measurements using, for example, the IMU, such as a collection of accelerometers, gyroscopes, and magnetometers. The PDR measurements can indicate distances and directions in which a user travels, such as when GPS devices are not available (e.g., the user is indoors). The sensory information can indicate or approximate the latitude and longitude 220 using, for example, the GPS device. Object recognition 225 can be performed using the camera, and temperature 230 can be obtained using the thermometer. Other types of sensory information not shown can be obtained using one or more sensory devices 120.

Figure 3:
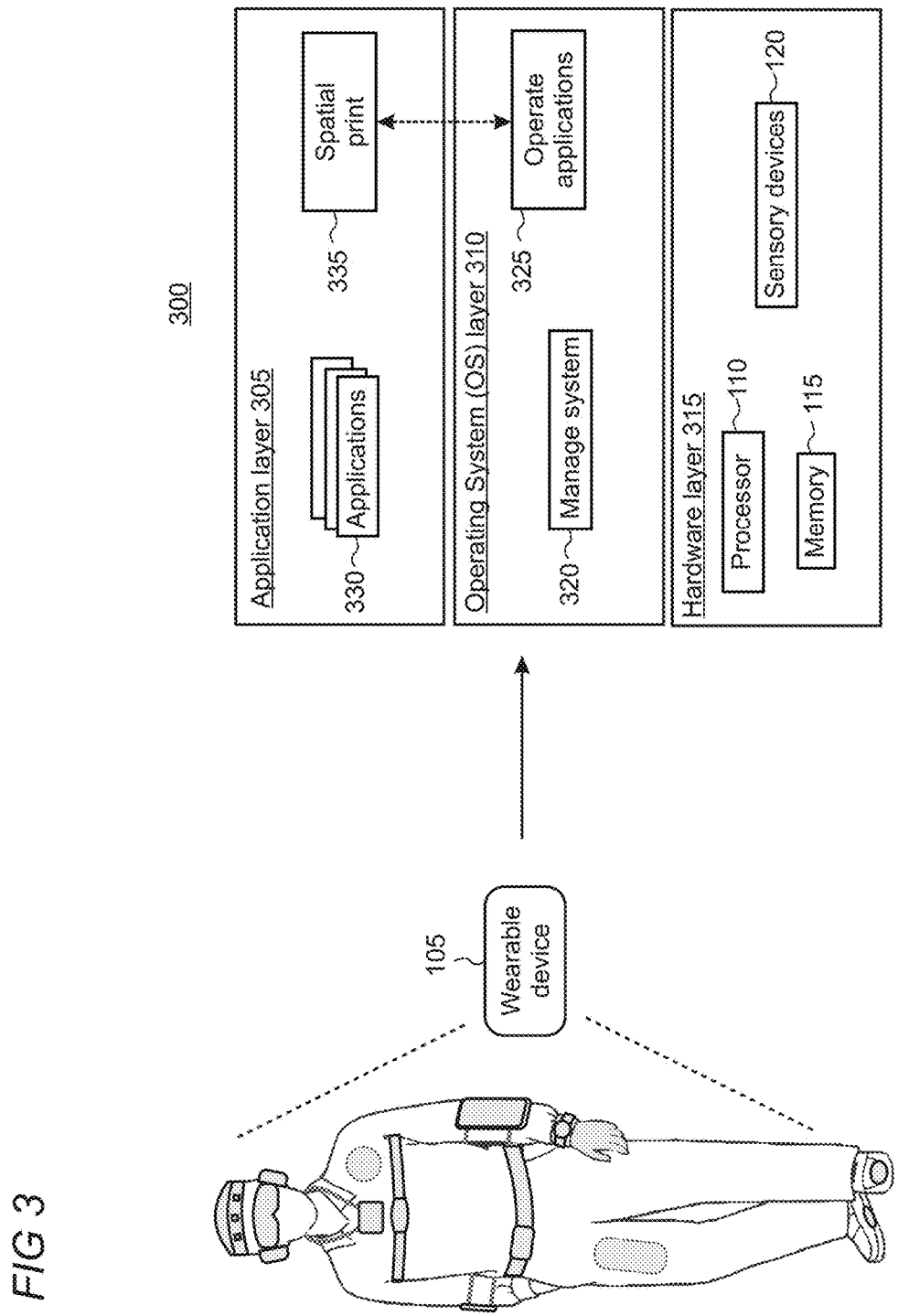
FIG. 3 shows an illustrative system architecture of the wearable device.

FIG. 3 shows an illustrative system architecture 300 of the wearable device 105. As depicted, the wearable device 105 may be implemented using components that are donned like eyeglass, caps, gloves, headbands, headsets, hats, helmets, earbuds, shoes, wristbands, and belts, and/or be positioned on the user's body using attachments like neck straps, arm/leg straps, lanyards, and the like. Wearable devices may also be incorporated or embedded into clothing. In typical implementations, wearable devices may be configured to provide hands-free and eyes-free experiences as the device operates, using battery power to facilitate portability and mobility.

In simplified form, the architecture is conceptually arranged in layers and includes a hardware layer 315, operating system (OS) layer 310, and application layer 305. The hardware layer 315 provides an abstraction of the various hardware used by the wearable device 105 (e.g., networking and radio hardware, etc.) to the layers above it. In this illustrative example and as shown in FIG. 1, the hardware layer supports processor(s) 110, memory 115, sensory devices 120, and network connectivity components (e.g., Wi-Fi transceiver). Although not shown, other components are also possible such as input/output devices, display screen, etc.

The application layer 305 in this illustrative example supports various applications 330, including an application configured to spatial print 335 as discussed herein. The spatial print is configured to generate a node within a spatial graph, pull data from each employed sensor, and associate the pulled data with the generated node. Nodes are created within the spatial graph when currently detected data for a respective sensory device changes and passes a threshold. Each sensor may be configured with its own threshold parameters. Thus, for example, when PDR data indicates the user traveled a threshold of six feet, the wearable device may create a node within the spatial graph and perform a spatial print in which data for all sensors are gathered and associated with that newly created node. In additional examples, spatial prints may be performed when a thermometer detects that the temperature increases or decreases by five or ten degrees, the camera recognizes an object, the microphone recognizes the sound of an object, and the like. In this regard, characteristics for certain objects may be pre-stored in memory so that the sensors on the wearable device can subsequently compare and recognize the objects.

Other applications not shown can include a web browser configured to provide connectivity to the world wide web, games, etc. Although only certain applications are depicted in FIG. 3, any number of applications can be utilized by the wearable device, whether proprietary or developed by third-parties. The applications are often implemented using locally executing code. However, in some cases these applications can rely on services and/or remote code execution provided by remote servers or other computing platforms such as those supported by a service provider or other cloud-based resources.

The OS layer 310 supports, among other operations, managing system 320 and operating applications 325, such as operate the spatial print application 335 (as illustratively shown by the arrow). The OS layer may interoperate with the application and hardware layers in order to perform various functions and features.

Figure 4:
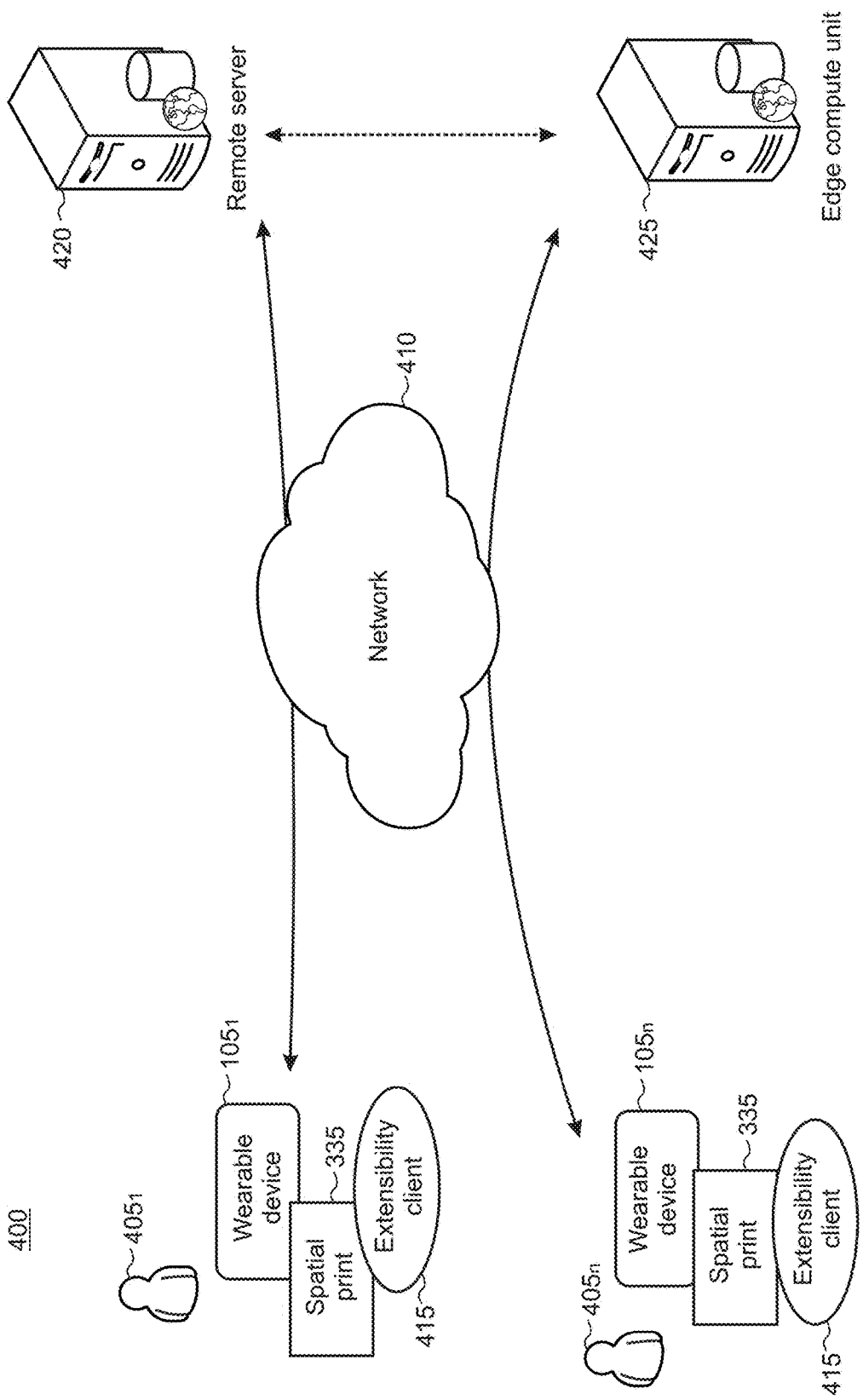
FIG. 4 shows an illustrative environment in which the wearable device interacts with a remote server and edge compute unit.

FIG. 4 shows an illustrative environment 400 in which a user 405 operates the wearable device 105, and the wearable device is configured to interoperate with external computing devices such as a remote server 420 and edge compute unit 425 over network 410. The network can include a local area network, wide area network, the Internet, and World Wide Web. In this regard, the edge compute unit may be located on-site to the wearable device, receive the spatial graph data, and then forward the data to the remote server. Additionally, alternative computing devices can be utilized, such as a tablet computer and smartphone (not shown), which are configured similarly to the wearable device. Furthermore, additional users, as shown in FIG. 4, can register with the remote server or edge compute unit, in which the additional users can utilize their own spatial graph data or can, with notice to the user and user consent, combine spatial graphs with one or more other users.

The remote server and edge compute unit can interoperate with an extensibility client 415 of the spatial print application 335, in which the external computing devices can, in whole or in part, construct the spatial graphs upon receiving the collected data from the wearable device's sensors. The wearable device may, for example, gather the data in which the extensibility client forwards the data to one of the external computer devices for processing. Therefore, any discussion with respect to spatial prints or spatial graph construction can be local to the wearable device, external thereto at the remote server or edge compute unit, or a combination thereof.

Figure 5:
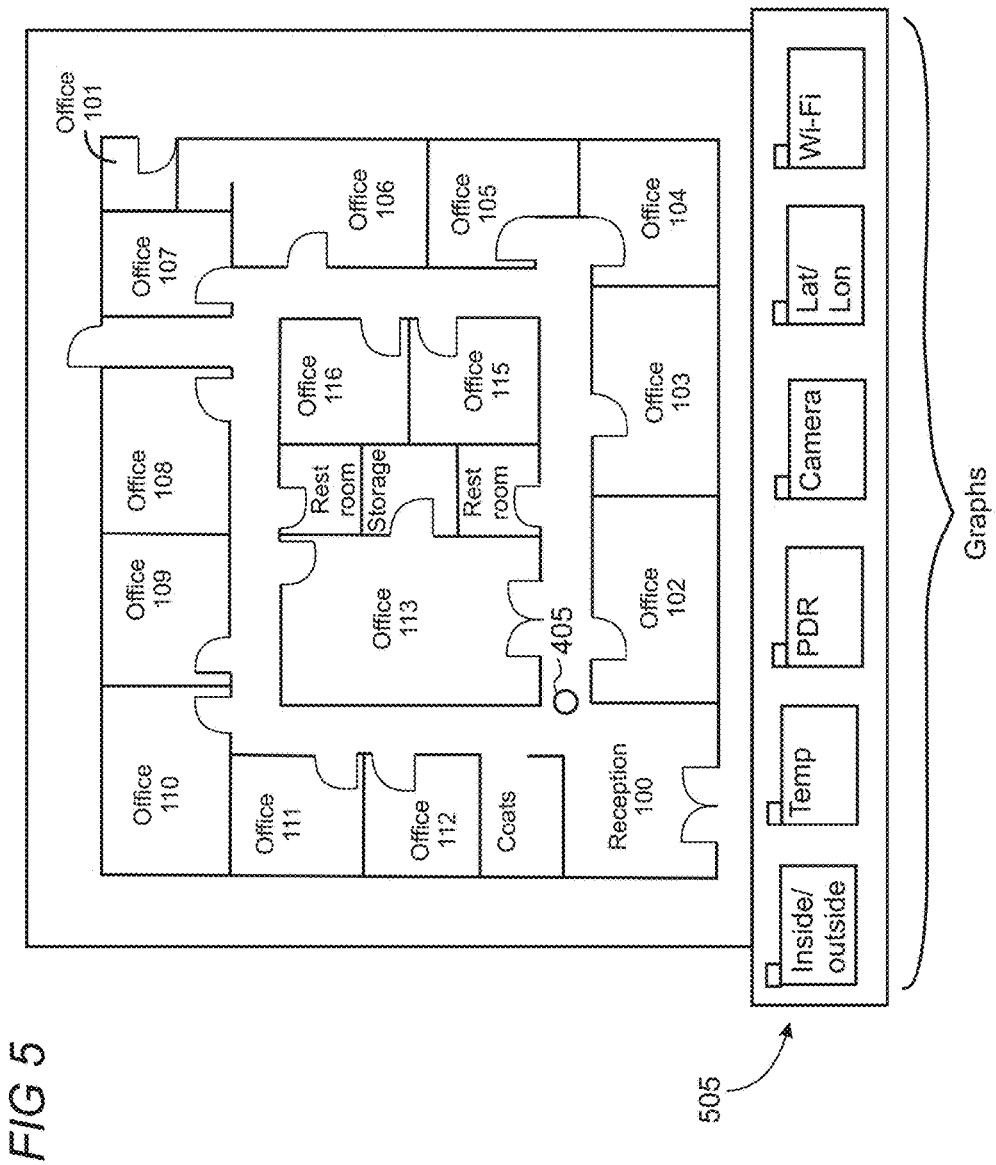
FIG. 5 shows an illustrative diagram of a physical environment and different types of sensory graphs.

FIG. 5 shows an illustrative diagram showing a physical environment and different types of sensory graphs 505. For example, the various sensory graphs may generate data while the user 405 navigates the physical environment, which in this example is an office building. Other types of physical environments include a store, a home, and the like. The sensory graphs may be data directly obtained from a single sensor or information that is obtained from one or a combination of sensors (FIG. 2). In this example, the sensory graphs are a determination whether the user is located inside or outside, temperature, PDR (e.g., distance traveled), camera (e.g., object recognition), changes in latitude and longitude, and Wi-Fi (e.g., changes in signal strength).

Figure 6:
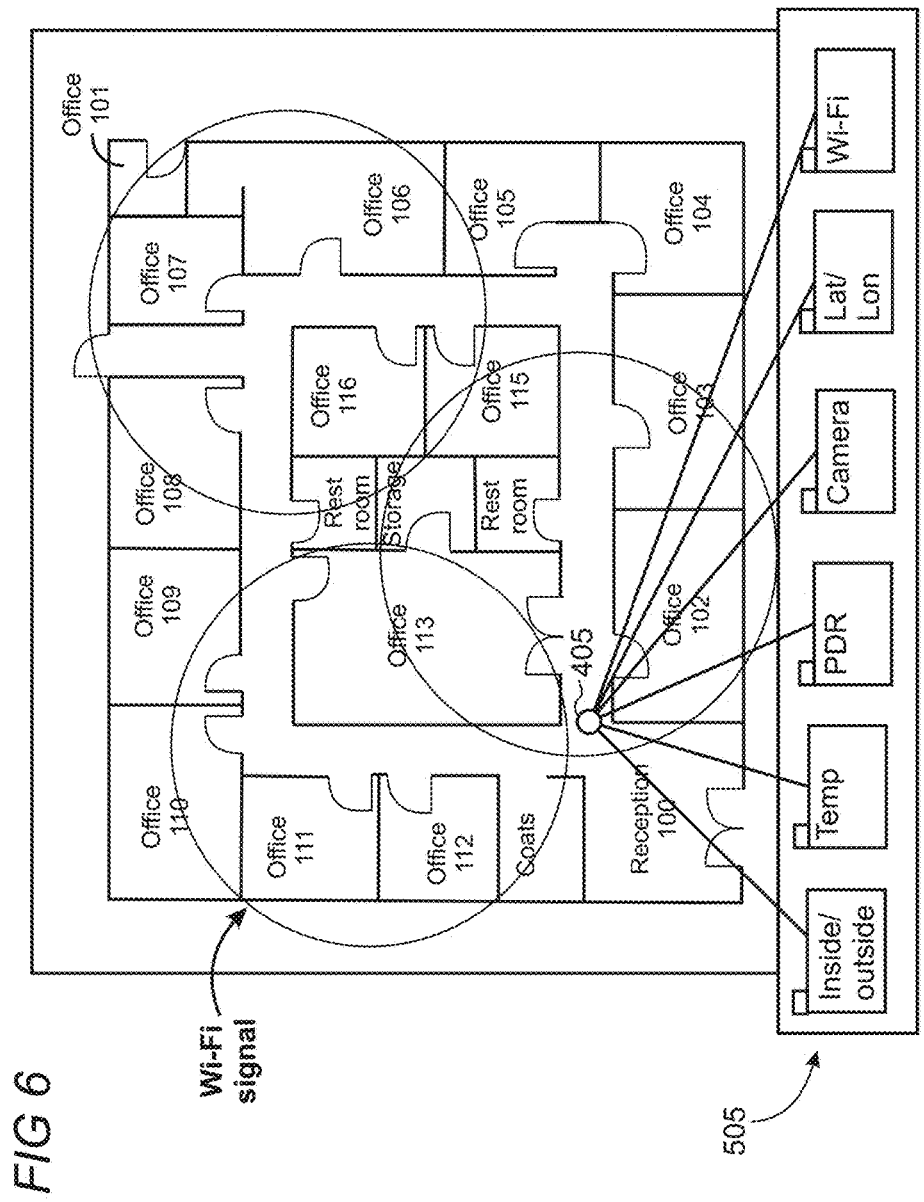
FIG. 6 shows an illustrative diagram with a spatial print of the sensory graphs triggered by changes in Wi-Fi signal strength.

FIG. 6 shows an illustrative spatial print which occurs because of changes in Wi-Fi signal strength. For example, the user 405 navigates the office building and a threshold change to Wi-Fi signal strength may occur. As a result of this threshold change, the wearable device queries each of the sensor graphs and/or sensory devices in real time, that is, the data may be queried immediately or virtually immediately when the threshold change is detected. The threshold change for the Wi-Fi signal may have been a change in decibel (dBm) strength, such as a plus or minus −10 dBm. The sensor graphs may be a current representation of the data for a particular sensory device or type of information derived from the sensory device (e.g., PDR data).

Figure 7:
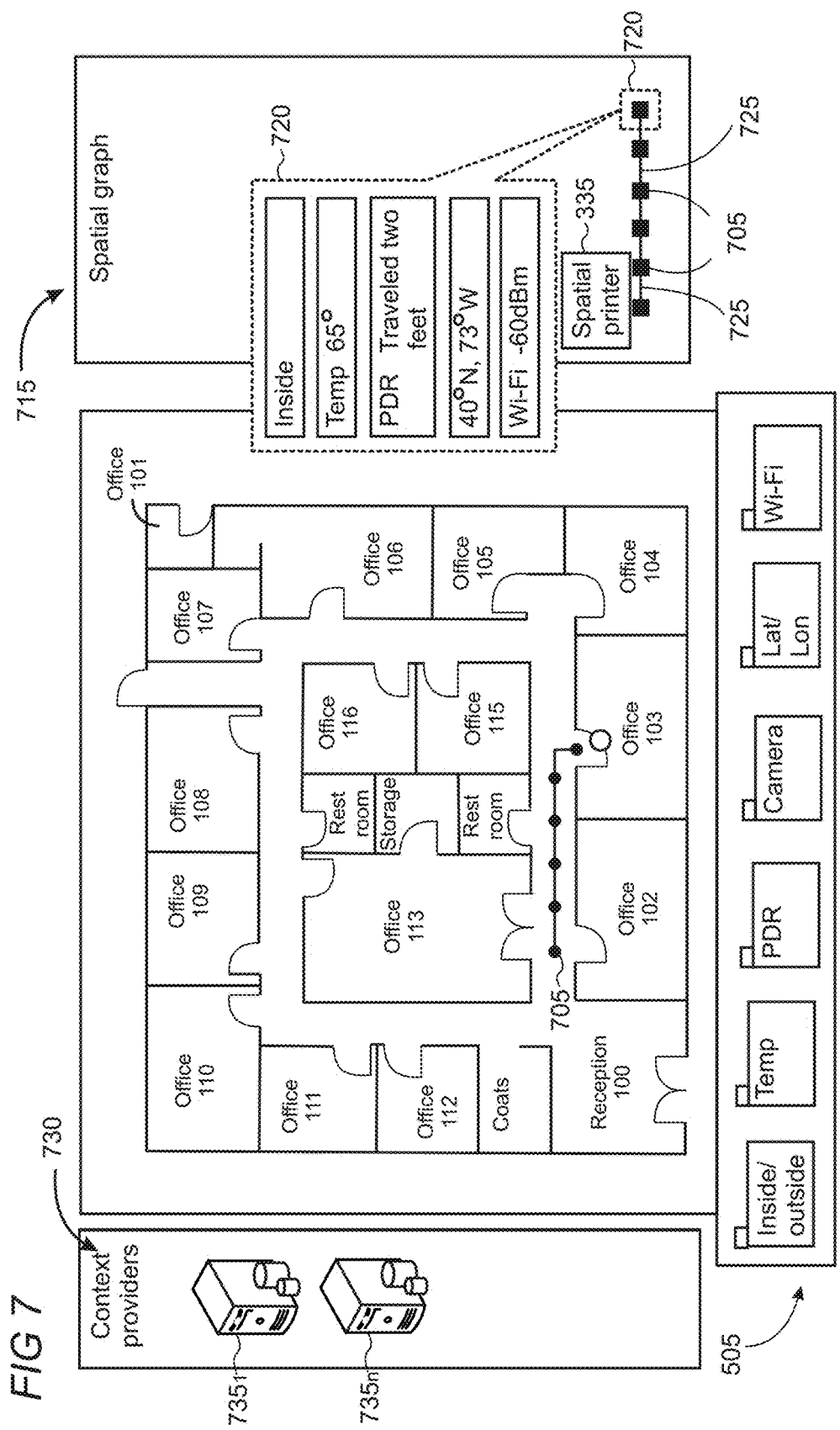
FIG. 7 shows an illustrative diagram with a spatial graph and nodes.

Once the queries for each of the sensor graphs is performed, a node is created at that location. FIG. 7 shows an illustrative diagram in which various nodes 705 have been created according to a spatial print 335 function. For example, each node may be created when sensor data associated with one or more sensors passes a set threshold. Thus, FIG. 6 showed the example of Wi-Fi signal strength triggering the data pull, but other sensor graphs also have threshold levels, such as PDR data indicating the user traveled a threshold number of feet.

The spatial print 335 function may be performed on one or a combination of the wearable device, remote server, or edge compute unit. For example, the wearable device may automatically perform the spatial print in which it queries the sensory data when one of its sensors surpass a threshold. The wearable device may either create the node or forward the data to one of the external computing devices to generate the nodes and spatial graph 715.

The nodes 705 are contained within the spatial graph 715 and, as shown in FIG. 7, correspond to actual locations within the physical environment where the data for the respective node was pulled. The spatial graph represents a collection of sensor graphs 505 and is a higher-order meta-graph that has a robust understanding of how locations and objects relate to each other. With the multiple sensory information placed into relational nodes, an understanding can be obtained for the relationship between objects and their environment.

The nodes are connected with edges 725 which provide logical and traceable connections among two or more nodes. Thus, for example, the various sensor graph data can be traced between nodes to help track a user's steps, so that the data can be collectively used. This facilitates tracking an object's location relative to locations, objects, and environmental characteristics, as opposed to absolute positioning. This can be useful for indoor positioning systems (IPS) when certain computing devices are technically deficient, such as GPS for indoor tracking. For example, if one or more nodes detected Bluetooth connectivity from a smartphone when the temperature was 32° within a supermarket, then that may indicate that the user was previously near his smartphone at a frozen food section of the supermarket. This may indicate to the user to search for his lost smartphone not only within the supermarket, but the frozen food section in the supermarket.

Call-out 720 shows exemplary data that can be pulled at a given node. In this example, the data indicates that the wearable device is located inside, the temperature is 65°, the PDR indicates the user traveled two feet from the previous node, the user's location is 40° North and 73° West, and the user's Wi-Fi strength is gauged at −60 dBm. Although the spatial print can query each of the sensor graphs 505, in an alternative embodiment only relevant sensor graphs can be queried. For example, once the wearable device determines the user is inside at an office building, the temperature data may not be relevant and therefore not pulled.

FIG. 7 shows context providers 730 can be used with the wearable device or other device creating the spatial graph, such as the edge compute unit or remote server (FIG. 4). The context providers can be external services which provide information about the user's environment. For example, the external services associated with servers 735 can provide information about the office building in which the user is located and maps information. The data can include scheduling information within a building (e.g., a meeting at office 112), number of people within an environment, details about the locations within an environment (e.g., different food sections in a supermarket, restroom location, locations of a particular individual's office), and address and company name information about the environment. Additionally, sensory information about an environment can also be retrieved, such as temperature information connected to a heating or cooling system, locations of objects within the environment based on sensory data, etc. This information can supplement the sensory information derived from the sensory devices. The information listed herein which can be obtained from external services is non-exhaustive, and any number of services or databases can be used to supplement the spatial graph data.

Figure 8:
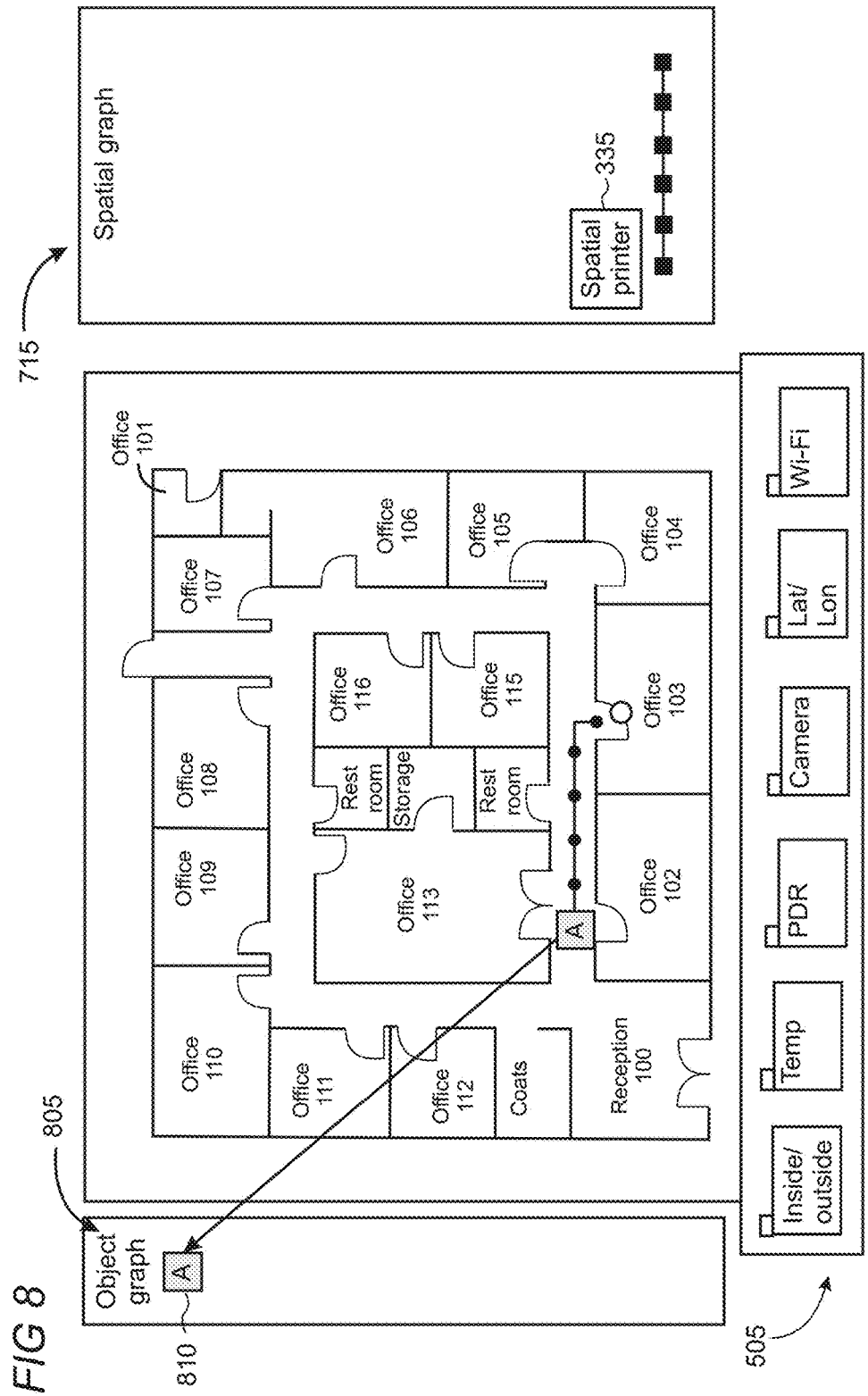
FIG. 8 shows an illustrative diagram with an object graph.

FIG. 8 shows an illustrative environment in which an object graph 805 is utilized for a user or application developer. In this example, object A (representatively indicated by numeral 810), has been tagged or added by the user. The object may have been input by user interactions with a user-interface associated with the wearable device or a separate computing device such as a personal computer (PC) or smartphone (not shown). When an object is tagged it becomes stored as a node within the object graph 805 in memory, which may be associated with the spatial graph. The tagging of an object also triggers a query for each of the sensory devices or sensor graphs. The query helps determine the sensor data that makes up the object, thereby digitizing and creating a blueprint for the object with various heterogenous sensory properties. For example, a camera can capture an image of the object and a microphone can record sounds of the object (such as keys); this data is then stored in memory.

Figure 9:
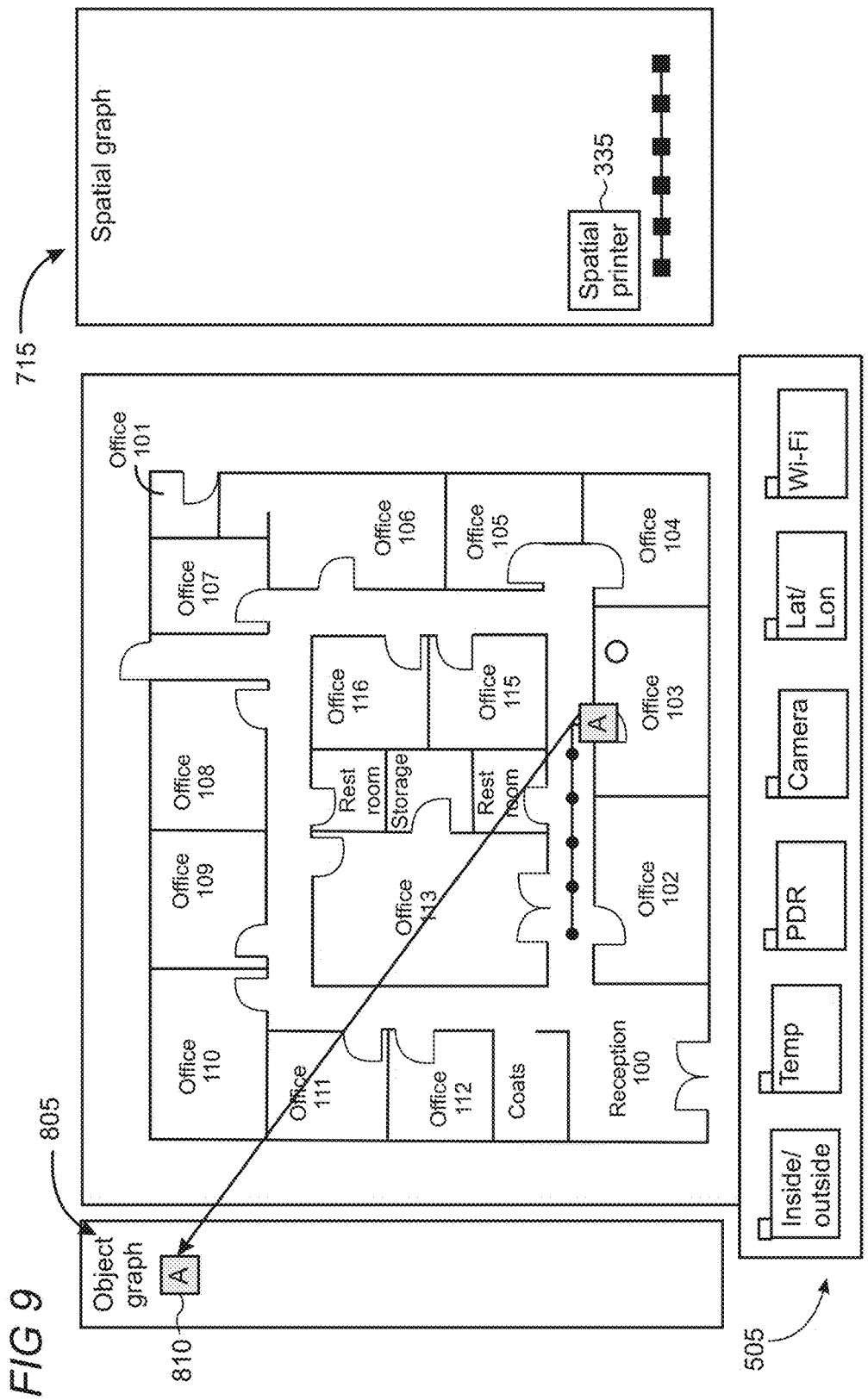
FIG. 9 shows an illustrative diagram in which a tagged object has changed positions.

FIG. 9 shows an illustrative environment in which object A has moved positions. In this situation, the wearable device may update the object's location by deleting the edge to the previous spatial print (FIG. 8), and create a new edge to the spatial print where the object was last detected (FIG. 9).

Figure 10:
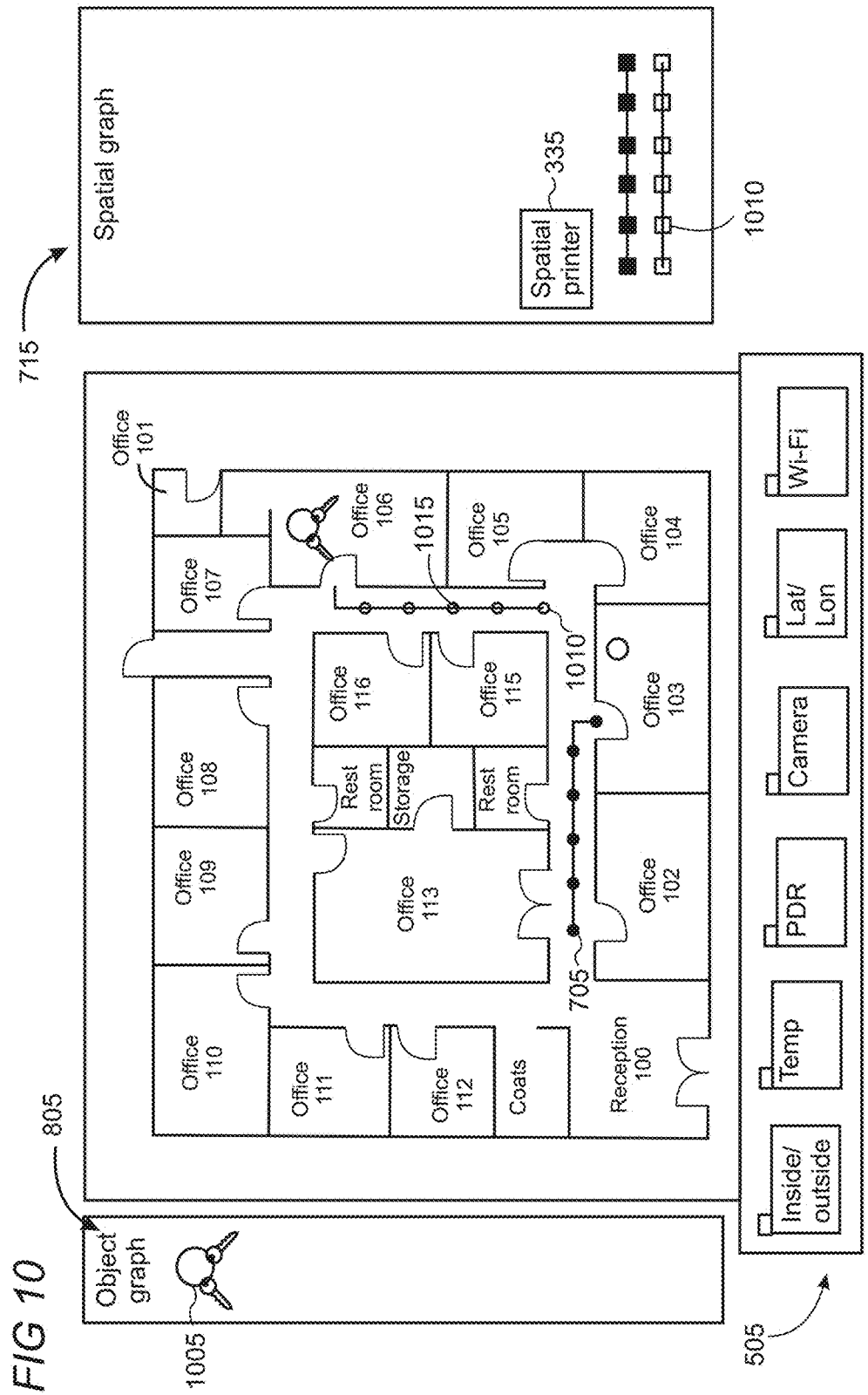
FIG. 10 shows an illustrative diagram in which a set of keys is the tagged object in the object graph.

FIG. 10 shows an illustrative environment in which a real-world object is used as the object for tracking. In this example, a set of keys 1005 have been previously input into the object graph 805, and the user may have queried the wearable device or other computing device to locate his keys within the office. Nodes 1010 may be associated with previous travels by the user, such as earlier that day, the previous day, etc. In analyzing the spatial graph data, the wearable device may determine that the microphone on the wearable device detected keys rattling at or near office 106. The wearable device or user's personal device (e.g., smartphone) can display to the user the inferred location or node for the keys. Additional relevant data that can support the inferred location or node is room temperature (e.g., indoors or typical temperature for the office), and images that may have been captured (e.g., of the office's physical environment and objects). The user can then begin his journey in searching for his keys in the vicinity of office 106.

Since the spatial graph includes multiple nodes and spatial prints of data, the wearable device can utilize the series of nodes and edges, or spatial print chains, to create an inferential and logical path or directions to the keys. Thus, the spatial print chains and the spatial graph in general can be traversed once created. For example, the wearable device can provide directions for the user in a reverse direction of the generated spatial print chain to trace the user's travels to the location in which the keys were lost and likely to be located. Each node within the spatial graph is associated with particular sensory data. Thus, the directions can trace and provide directions to that location for the user as the user navigates through the office. For example, as the user continues to follow the directions and the wearable device continues to sense subsequent data, the previous data associated with pre-existing nodes can verify that the subsequent data comports with the previous data. This allows the user to traverse the nodes within the spatial graph and receive subsequent and verifiable instructions.

As one example, the wearable device may recognize that at node 1015 the temperature drops by five degrees. The wearable device therefore verifies the subsequent sensor data with previous sensor data and can accordingly further direct the user to continue walking straight. Additional examples of data at nodes which allow the user to traverse a spatial graph include a camera recognizing a particular object at the location, a proximity sensor detecting a narrow space, a light sensor detecting too much or too little light, and the like.

Figure 11:
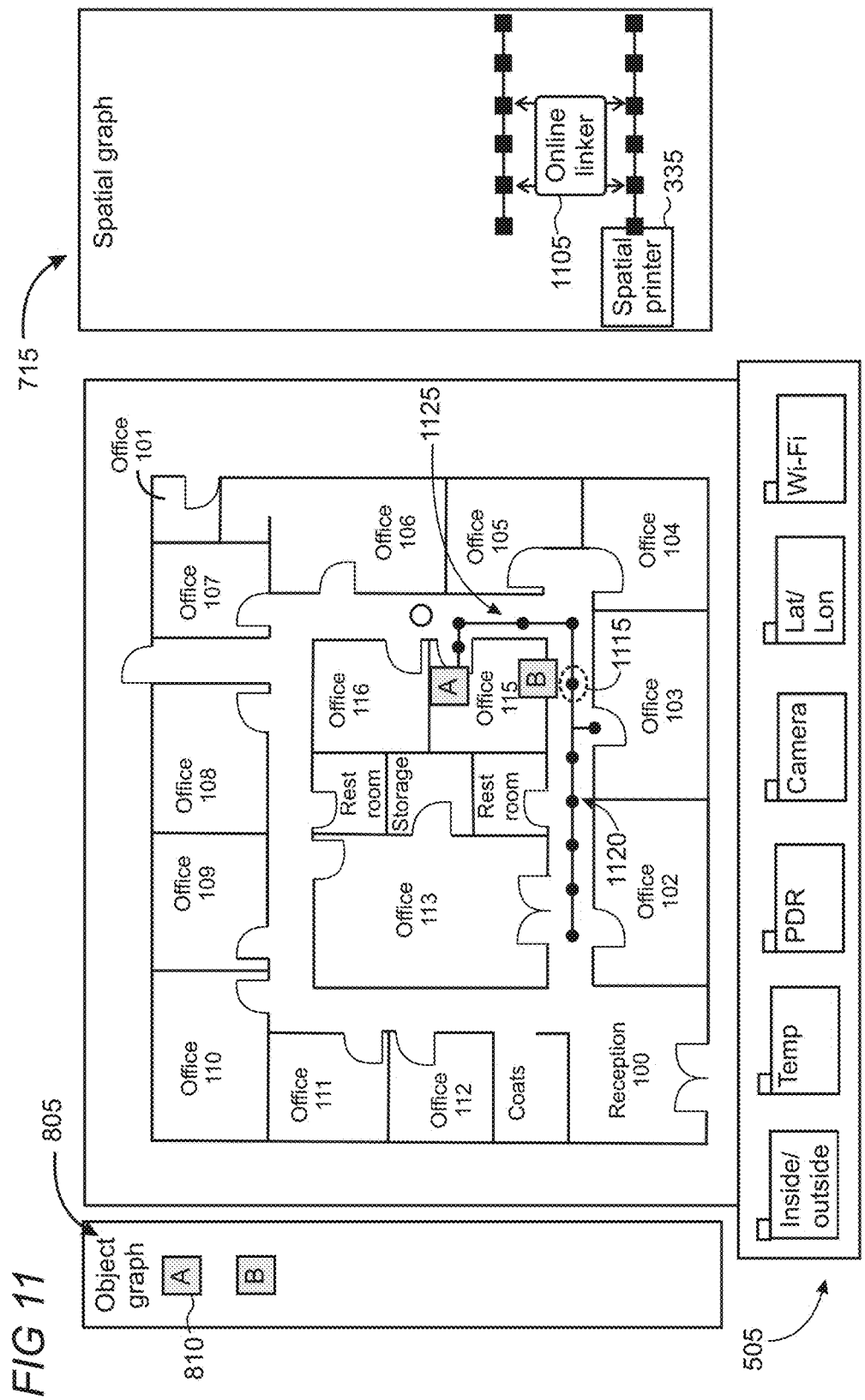
FIG. 11 shows an illustrative diagram in which an online linker links two spatial print chains.

FIG. 11 shows an illustrative environment in which an online linker 1105 links spatial print chains as they are being built. For example, the spatial graph may be stored locally at the wearable device or edge compute unit, or remotely at the remote server (FIG. 4) as it is built. When the wearable device enters an online, or connected, state again, where the wearable device operates and creates spatial prints, existing spatial print chains (e.g., connected nodes and edges) can be searched to find connections with developing spatial print chains. This can allow spatial print chains to connect organically as they are encountered and generated. The online linker functionalities may be performed at the wearable device, edge compute unit, remote server, or a combination of the components.

Connections can occur based on, for example, relationships or similarities between nodes or spatial print chains. For example, if two nodes or chains are positioned adjacent to each other and created at near times, then that may result in a connection. FIG. 11 shows a first spatial print chain 1120 and a second spatial print chain 1125. In this example, the node at connection 1115, near object B, is the logical connection between the two chains. The similarities that allow connections between chains may have minimum or maximum threshold requirements, such as created within a certain time period (e.g., five minutes) or are positioned a threshold distance (e.g., ten feet) from each other.

Figure 12:
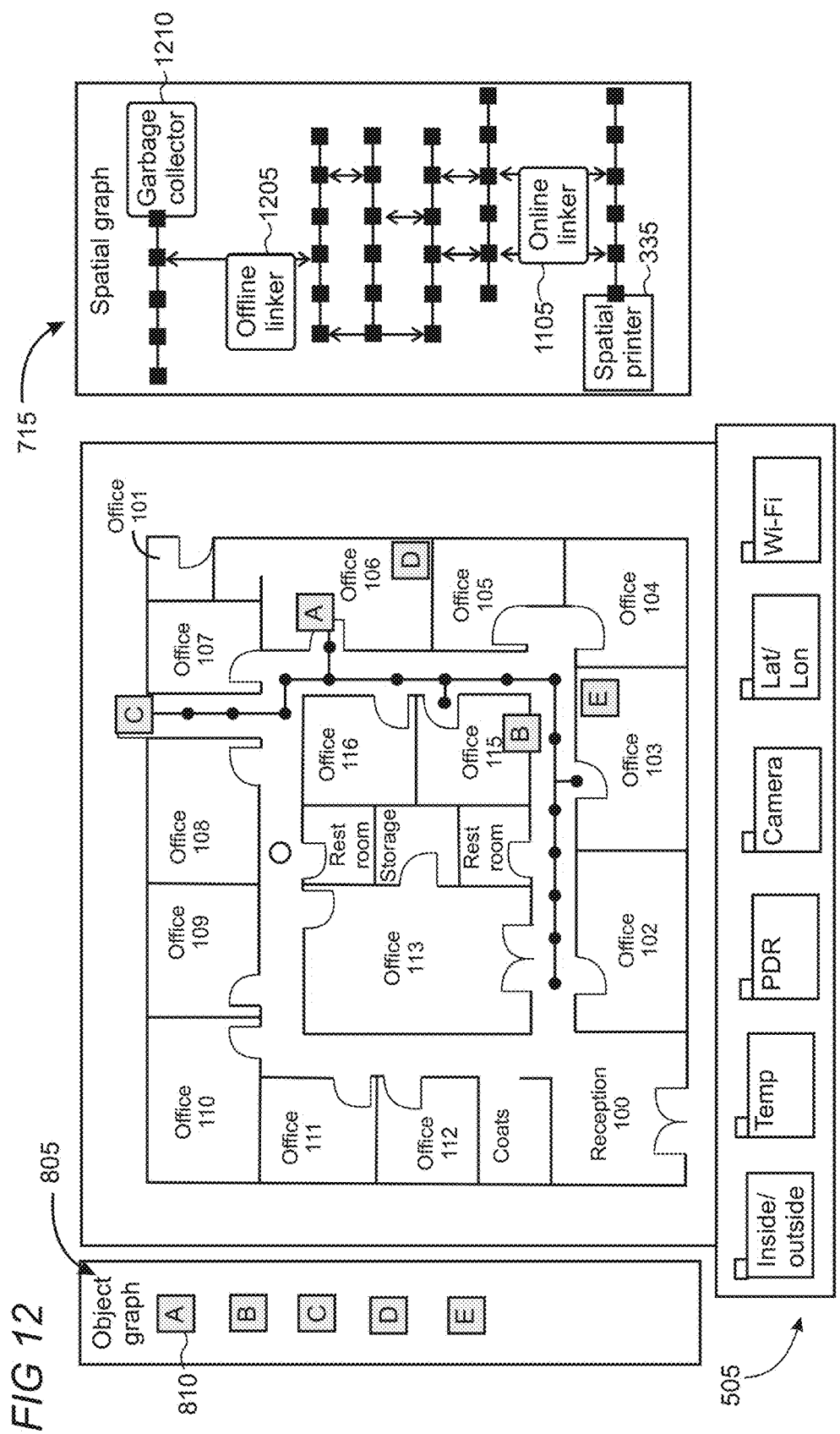
FIG. 12 shows an illustrative diagram which utilizes an offline linker and a garbage collector.

FIG. 12 shows an illustrative detailed environment showing additional objects in the object graph, an offline linker 1205, and a garbage collector 1210. At times, spatial print chains may not be connectable, such as when separate chains include too much distance between them or otherwise there is no direct link. In this scenario, the remote server may search for connections between recently uploaded data and previously uploaded data. The offline linker may look, for example, for spatial print chains that have nodes that are spatially near each other and include one or more similarities in the spatial graph data. For example, time, location, and other relevant sensor data can help locate the logical connections among nodes and edges.

The garbage collector 1210 may identify and delete data, nodes, edges, etc. which become stale over time. For example, stale data may be identified based on its age (e.g., too old and not useful), size (e.g., files are too large and taking up too much space in memory), usefulness (e.g., user identified certain types or time frames of data as irrelevant), etc.

Figure 13:
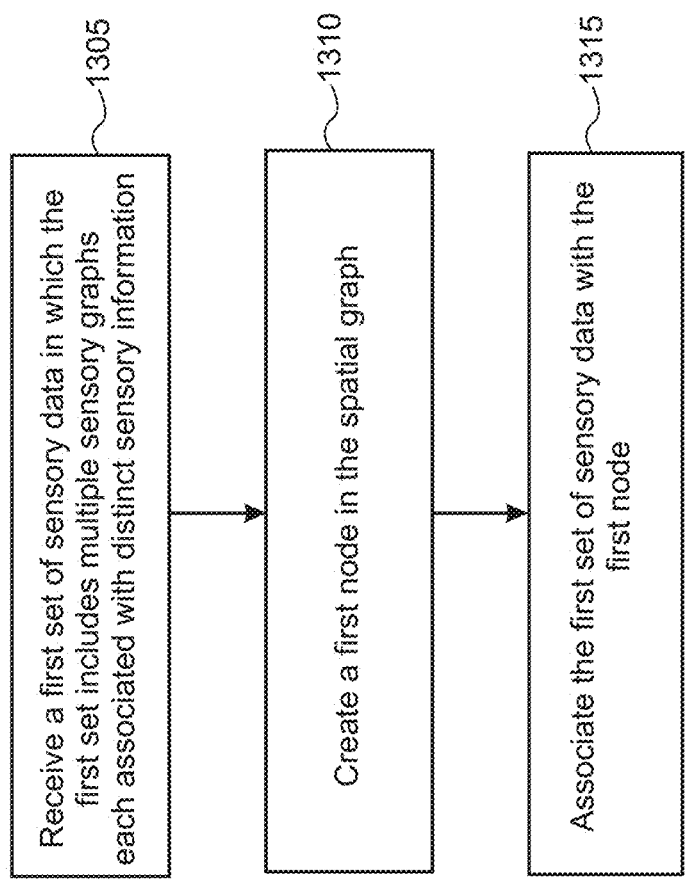
FIGS. 13-15 show illustrative processes performed by one or more wearable, an edge compute unit, or a remote server.

FIG. 13 is a flowchart of an illustrative method 1300 in which a computing device associates distinct sensory data with a node. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1305, a first set of sensory data is received, in which the data includes multiple sensory graphs each associated with distinct sensory information. In step 1310, a first node is created in a spatial graph. In step 1315, the first set of sensory data is associated with the first node.

Figure 14:
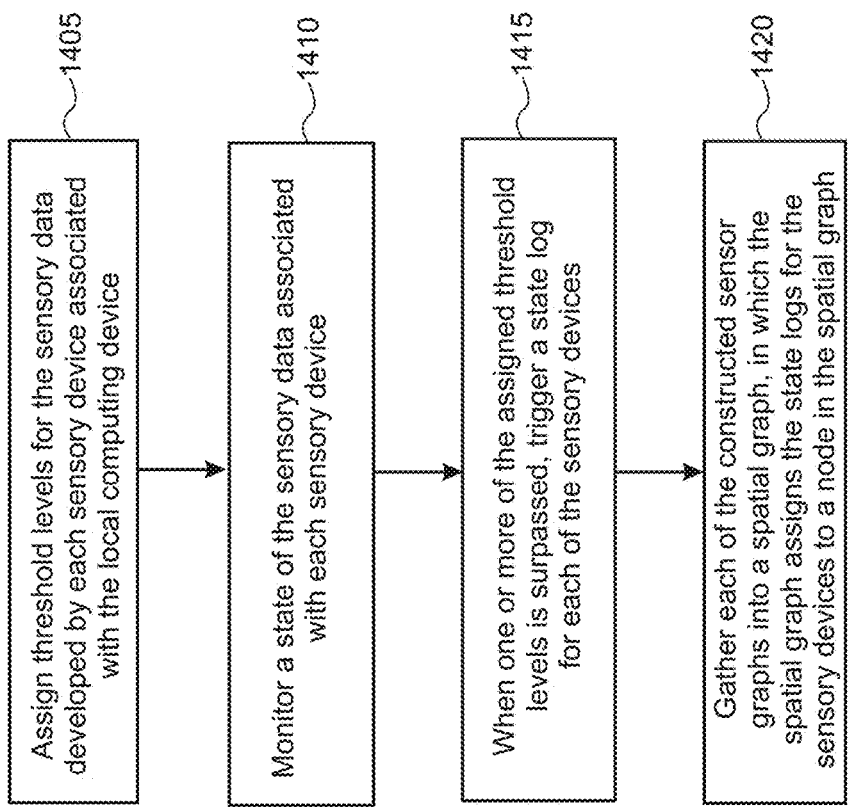

FIG. 14 is a flowchart of an illustrative method 1400 in which a computing device utilizes sensory graphs for a spatial graph. In step 1405, threshold levels for the sensory data are assigned, in which the sensory data is derived from sensory devices. In step 1410, a state of the sensory data associated with each sensory device is monitored. In step 1415, when one or more of the assigned threshold levels are surpassed, a state log is triggered for each of the sensory devices. A state log can include, for example, a data pull for current data associated with various sensory devices or sensor graphs. In step 1420, each of the constructed sensor graphs are gathered into a spatial graph. The spatial graph may, for example, assign the state logs for the sensory devices to a node in the spatial graph.

Figure 15:
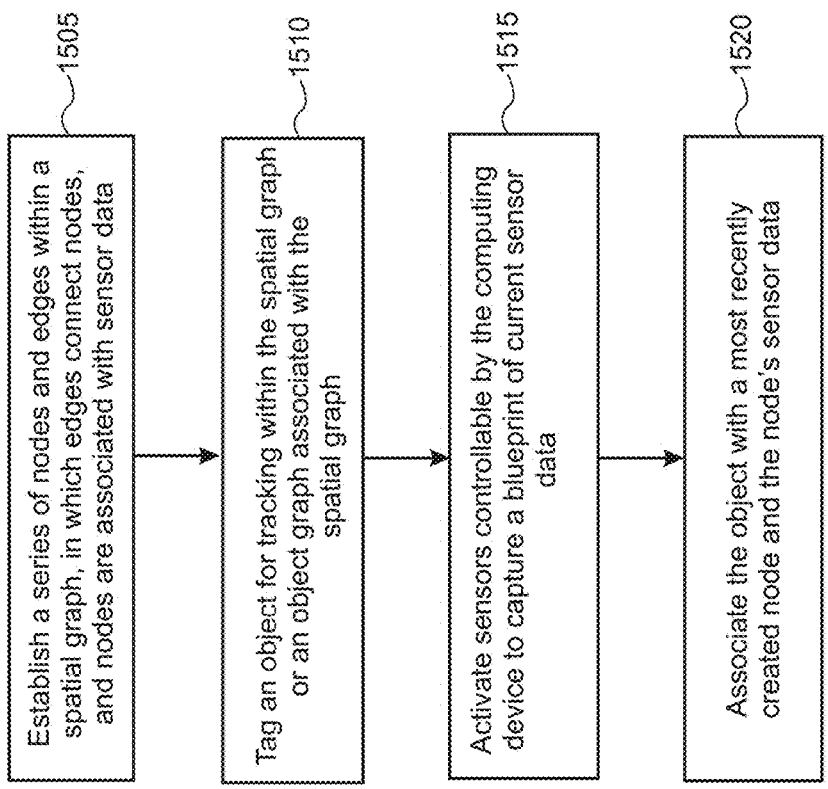

FIG. 15 is a flowchart of an illustrative method 1500 in which a computing device creates a blueprint of a tagged object. In step 1505, a series of nodes and edges within a spatial graph are established, in which edges connect nodes and nodes are associated with sensor data. In step 1510, an object for tracking is tagged within the spatial graph or an object graph associated with the spatial graph. In step 1515, sensors controllable by the computing device are activated to capture a blueprint of current sensor data. For example, each sensory device may be queried, in which data is pulled from each one. In step 1520, the object is associated with a most recently created node and the node's sensor data.

Figure 16:
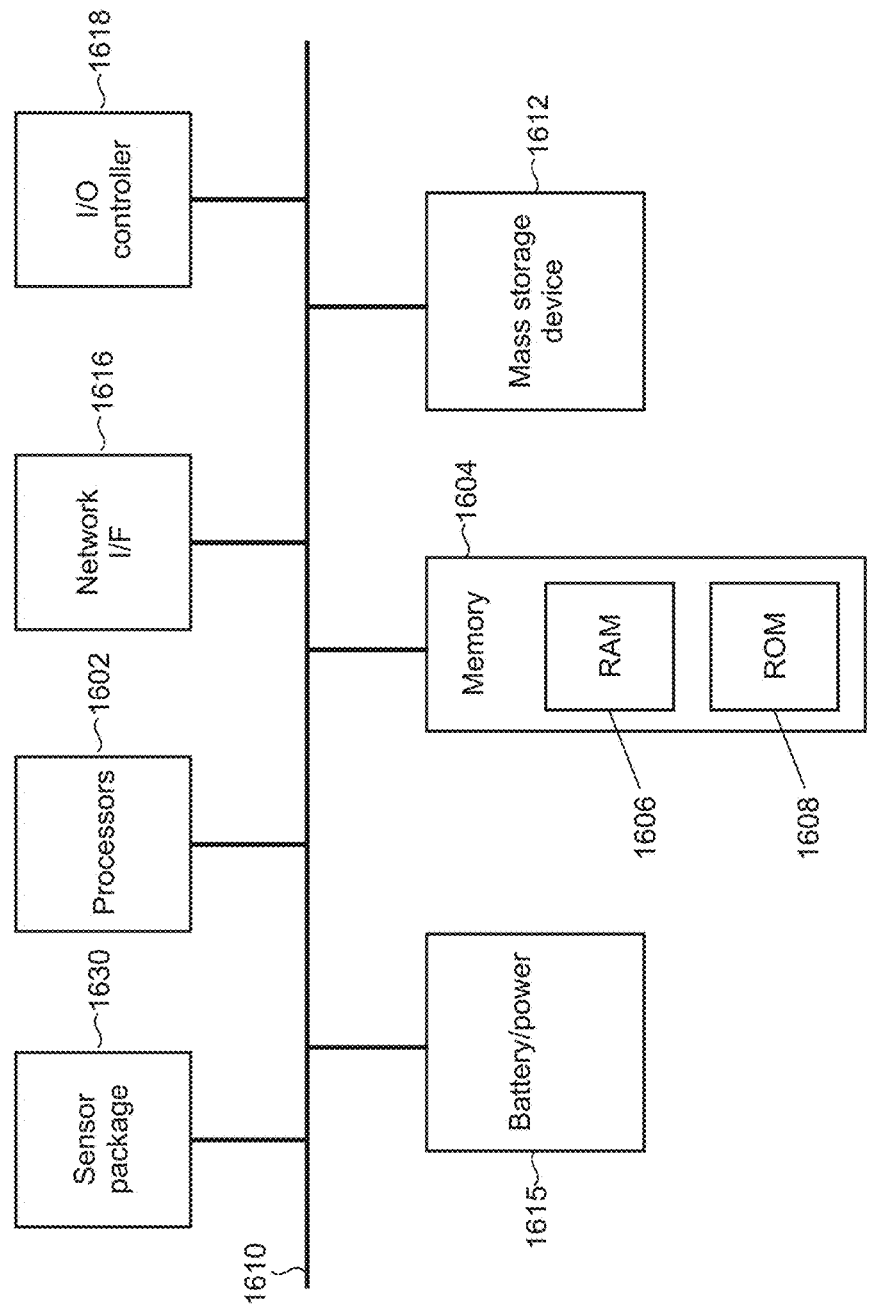
FIG. 16 is a simplified block diagram of an illustrative wearable device that may be used in part to implement the use of the one-dimensional ray sensor to map an environment.

FIG. 16 shows an illustrative architecture 1600 for a device capable of executing the various components described herein for providing the present user and device authentication for web applications. Thus, the architecture 1600 illustrated in FIG. 16 shows an architecture that may be adapted for a wearable device, a server computer, mobile phone, a PDA, a smartphone, a desktop computer, a netbook computer, a tablet computer, GPS device, gaming console, and/or a laptop computer. The architecture 1600 may be utilized to execute any aspect of the components presented herein.

The architecture 1600 illustrated in FIG. 16 includes one or more processors 1602 (e.g., central processing unit, graphic processing units, etc.), a system memory 1604, including RAM (random access memory) 1606 and ROM (read only memory) 1608, and a system bus 1610 that operatively and functionally couples the components in the architecture 1600. A basic input/output system containing the basic routines that help to transfer information between elements within the architecture 1600, such as during startup, is typically stored in the ROM 1608. The architecture 1600 further includes a mass storage device 1612 for storing software code or other computer-executed code that is utilized to implement applications, the file system, and the operating system. The mass storage device 1612 is connected to the processor 1602 through a mass storage controller (not shown) connected to the bus 1610. The mass storage device 1612 and its associated computer-readable storage media provide non-volatile storage for the architecture 1600. Although the description of computer-readable storage media contained herein refers to a mass storage device, such as a hard disk or CD-ROM drive, it may be appreciated by those skilled in the art that computer-readable storage media can be any available storage media that can be accessed by the architecture 1600.

The architecture 1600 further supports a sensor package 1630 comprising one or more sensors or components that are configured to detect parameters that are descriptive of the environment and/or detect parameters that are descriptive of the device user, or combinations therein. For example, for a wearable computing device, the sensors may be positioned directly or indirectly on the user's body. The sensors may be configured to run continuously, or periodically, and typically in hands-free and/or eyes-free manners. The architecture further supports power and/or battery components (collectively identified by reference numeral 1615). For example, in wearable device applications, one or more batteries or power packs may be rechargeable or replaceable to facilitate portability and mobility.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1600.

According to various embodiments, the architecture 1600 may operate in a networked environment using logical connections to remote computers through a network. The architecture 1600 may connect to the network through a network interface unit 1616 connected to the bus 1610. It may be appreciated that the network interface unit 1616 also may be utilized to connect to other types of networks and remote computer systems. The architecture 1600 also may include an input/output controller 1618 for receiving and processing input from a number of other devices, including a keyboard, mouse, touchpad, touchscreen, control devices such as buttons and switches or electronic stylus (not shown in FIG. 16). Similarly, the input/output controller 1618 may provide output to a display screen, user interface a printer, or other type of output device (also not shown in FIG. 16).

The architecture 1600 may include a voice recognition unit (not shown) to facilitate user interaction with a device supporting the architecture through voice commands, a natural language interface, or through voice interactions with a personal digital assistant (such as the Cortana® personal digital assistant provided by Microsoft Corporation). The architecture 1600 may include a gesture recognition unit (not shown) to facilitate user interaction with a device supporting the architecture through sensed gestures, movements, and/or other sensed inputs.

It may be appreciated that the software components described herein may, when loaded into the processor 1602 and executed, transform the processor 1602 and the overall architecture 1600 from a general-purpose computing system into a special-purpose computing system customized to facilitate the functionality presented herein. The processor 1602 may be constructed from any number of transistors or other discrete circuit elements, which may individually or collectively assume any number of states. More specifically, the processor 1602 may operate as a finite-state machine, in response to executable instructions contained within the software modules disclosed herein. These computer-executable instructions may transform the processor 1602 by specifying how the processor 1602 transitions between states, thereby transforming the transistors or other discrete hardware elements constituting the processor 1602.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1600 in order to store and execute the software components presented herein. It also may be appreciated that the architecture 1600 may include other types of computing devices, including wearable devices, handheld computers, embedded computer systems, smartphones, PDAs, and other types of computing devices known to those skilled in the art. It is also contemplated that the architecture 1600 may not include all of the components shown in FIG. 16, may include other components that are not explicitly shown in FIG. 16, or may utilize an architecture completely different from that shown in FIG. 16.

Figure 17:
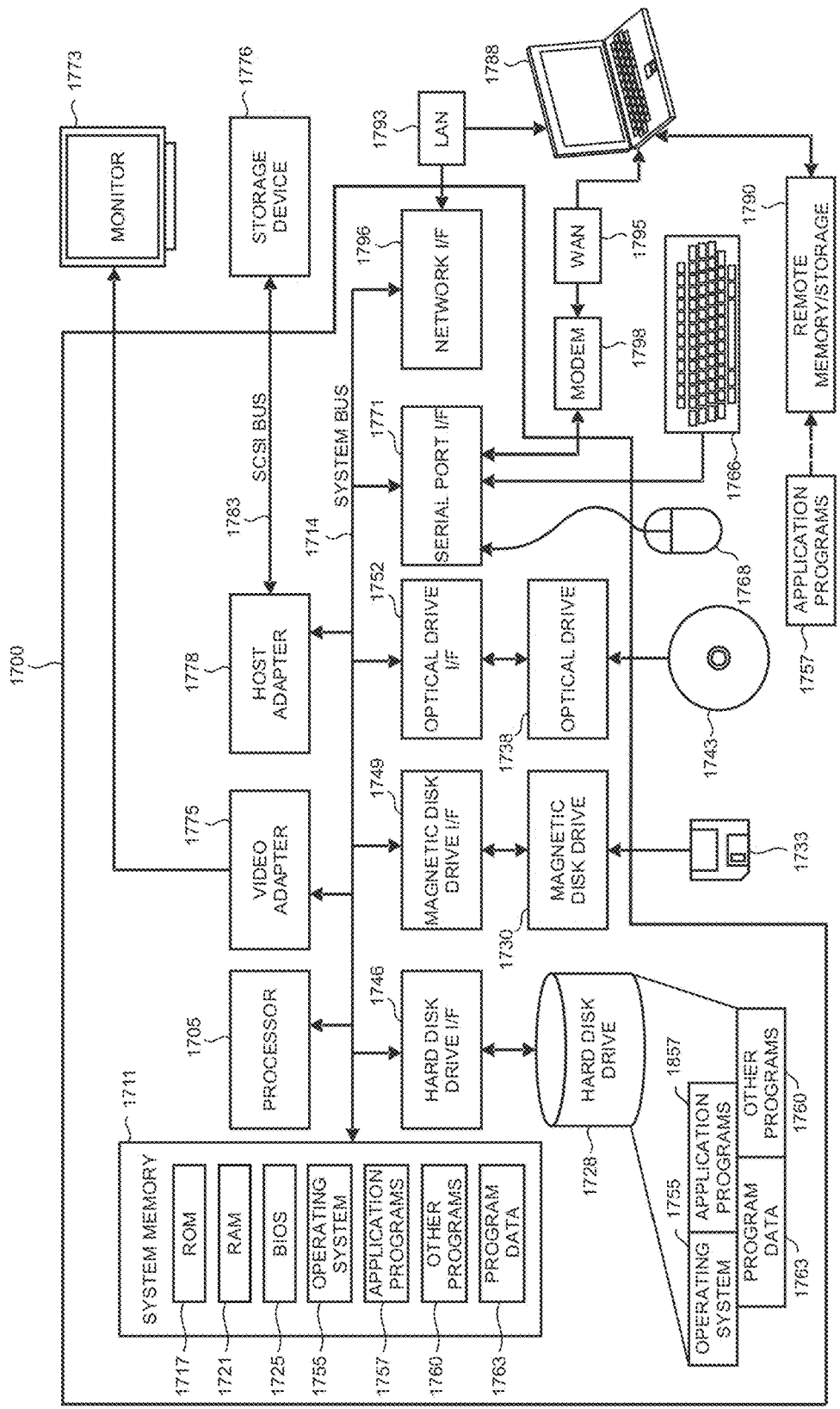
FIG. 17 is a simplified block diagram of an illustrative computer system that may be used in part to implement the object and location tracking with a graph-of-graphs.

FIG. 17 is a simplified block diagram of an illustrative computer system 1700 such as a wearable device with which the present object and location tracking with graph-of-graphs may be implemented. Although a wearable device is discussed herein, other computing devices with similar configurations discussed herein may also be used, including smartphones, tablet computing devices, personal computers (PCs), laptops, etc. Computer system 1700 includes a processor 1705, a system memory 1711, and a system bus 1714 that couples various system components including the system memory 1711 to the processor 1705. The system bus 1714 may be any of several types of bus structures including a memory bus or memory controller, a peripheral bus, or a local bus using any of a variety of bus architectures. The system memory 1711 includes read only memory (ROM) 1717 and random access memory (RAM) 1721. A basic input/output system (BIOS) 1725, containing the basic routines that help to transfer information between elements within the computer system 1700, such as during startup, is stored in ROM 1717. The computer system 1700 may further include a hard disk drive 1728 for reading from and writing to an internally disposed hard disk (not shown), a magnetic disk drive 1730 for reading from or writing to a removable magnetic disk 1733 (e.g., a floppy disk), and an optical disk drive 1738 for reading from or writing to a removable optical disk 1743 such as a CD (compact disc), DVD (digital versatile disc), or other optical media. The hard disk drive 1728, magnetic disk drive 1730, and optical disk drive 1738 are connected to the system bus 1714 by a hard disk drive interface 1746, a magnetic disk drive interface 1749, and an optical drive interface 1752, respectively. The drives and their associated computer-readable storage media provide non-volatile storage of computer-readable instructions, data structures, program modules, and other data for the computer system 1700. Although this illustrative example includes a hard disk, a removable magnetic disk 1733, and a removable optical disk 1743, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present object and location tracking with a graph-of-graphs. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk, magnetic disk, optical disk, ROM 1717, or RAM 1721, including an operating system 1755, one or more application programs 1757, other program modules 1760, and program data 1763. A user may enter commands and information into the computer system 1700 through input devices such as a keyboard 1766 and pointing device 1768 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1705 through a serial port interface 1771 that is coupled to the system bus 1714, but may be connected by other interfaces, such as a parallel port, game port, or universal serial bus (USB). A monitor 1773 or other type of display device is also connected to the system bus 1714 via an interface, such as a video adapter 1775. In addition to the monitor 1773, wearable devices and personal computers can typically include other peripheral output devices (not shown), such as speakers and printers. The illustrative example shown in FIG. 17 also includes a host adapter 1778, a Small Computer System Interface (SCSI) bus 1783, and an external storage device 1776 connected to the SCSI bus 1783.

The computer system 1700 is operable in a networked environment using logical connections to one or more remote computers, such as a remote computer 1788. The remote computer 1788 may be selected as a personal computer, a server, a router, a network PC, a peer device, or other common network node, and typically includes many or all of the elements described above relative to the computer system 1700, although only a single representative remote memory/storage device 1790 is shown in FIG. 17. The logical connections depicted in FIG. 17 include a local area network (LAN) 1793 and a wide area network (WAN) 1795. Such networking environments are often deployed, for example, in offices, enterprise-wide computer networks, intranets, and the Internet.

When used in a LAN networking environment, the computer system 1700 is connected to the local area network 1793 through a network interface or adapter 1796. When used in a WAN networking environment, the computer system 1700 typically includes a broadband modem 1798, network gateway, or other means for establishing communications over the wide area network 1795, such as the Internet. The broadband modem 1798, which may be internal or external, is connected to the system bus 1714 via a serial port interface 1771. In a networked environment, program modules related to the computer system 1700, or portions thereof, may be stored in the remote memory storage device 1790. It is noted that the network connections shown in FIG. 17 are illustrative and other means of establishing a communications link between the computers may be used depending on the specific requirements of an application of the present object and location tracking with a graph-of-graphs.

Various exemplary embodiments of the present object and location tracking with a graph-of-graphs are now presented by way of illustration and not as an exhaustive list of all embodiments. An example includes a computing device configured to collect and synthesize sensory data to track objects, comprising: one or more processors; memory configured to store a spatial graph and the sensory data which is associated with nodes in the spatial graph, the memory having computer-readable instructions which, when executed by the one or more processors, cause the computing device to: receive a first set of sensory data in which the first set includes multiple sensory graphs, each associated with distinct sensory information; create a first node in the spatial graph; and associate the first set of sensory data with the first node.

In another example, the computer-readable instructions further cause the computing device to: receive a subsequent set of sensory data; create a subsequent node in the spatial graph; associate the subsequent set of sensory data with the subsequent node; and create an edge in the spatial graph which links the first node to the subsequent node, in which the first node becomes a pre-existing node to the subsequent node. In another example, the computer-readable instructions further cause the computing device to: create a series of nodes and edges to create a spatial print chain; locate an object based on sensory data associated with one or more nodes in the series of nodes; and create directions for a user to traverse the edges and nodes within the spatial print chain, wherein the directions lead the user to the object, in which current sensory data and previous sensory data associated with nodes are used to create the directions. In another example, the sets of sensory data are received when one or more measurements in the sensory graphs pass a threshold. In another example, when at least one of the measurements in the sensory graphs pass the threshold, each sensory device is queried to generate the sensory data for a new node. In another example, the sensory data is received from a user's computing device or an edge compute unit configured to store the nodes and sensory data for one or more wearable devices. In another example, the computer-readable instructions further cause the computing device to: communicate with an external context provider which provides additional context and sensory information for a physical environment, in which the context or sensory information at least includes maps for the physical environment, an amount of people occupying a space, scheduling events within the physical environment, details about rooms in the physical environment, or sensory information to be associated with the nodes. In another example, the computer-readable instructions further cause the computing device to: construct spatial print chains using a collection of nodes and edges connecting the nodes, in which each spatial print chain is comprised of its own respective collection of nodes and edges; and connect two different spatial print chains to form one single spatial print chain. In another example, the two different spatial print chains are connected when an offline computing device establishes an internet connection and transmits the spatial print chain to the computing device. In another example, the two different spatial print chains are connected when both chains share a relationship to each other.

A further example includes a method performed by a local computing device within a physical environment to generate sensory data for a spatial graph, comprising: assigning threshold levels for the sensory data developed by each sensory device associated with the local computing device; monitoring a state of the sensory data associated with each sensory device; when one or more of the assigned threshold levels associated with respective sensory devices is surpassed according to the state monitoring, triggering a state log for each of the sensory devices where the local computing device constructs a sensor graph based on current sensory data for each sensory device; gather each of the constructed sensor graphs into a spatial graph, in which the spatial graph assigns the state logs for the sensory devices to a node in the spatial graph.

In another example, the assigned threshold levels for each sensory device represent a change in sensor state. In another example, the sensory devices include at least one of a global positioning system (GPS), Wi-Fi, Bluetooth®, camera, thermometer, magnetometer, pedometer, accelerometer, gyroscope, inertial measurement unit (IMU), microphone, proximity sensor, barometer, and light sensor. In another example, the method further comprises: receiving, at a user interface (UI) of the local computing device, input to tag an object using the spatial graph; and responsive to the received input, querying the sensory devices for sensor data associated with the tagged object to generate a blueprint of data for the tagged object. In another example, the method further comprises: receiving a subsequent input to locate the tagged object; locating indications at one or more nodes within the spatial graph that represent the tagged object; and outputting on the UI the one or more nodes or locations associated with the one or more nodes of the located indications. In another example, the indications include correspondences between original sensor data from when the object was tagged and subsequent data within the spatial graph.

A further example includes one or more hardware-based computer-readable memory devices storing instructions which, when executed by one or more processors disposed in a computing device, cause the computing device to: establish a series of nodes and edges within a spatial graph, in which edges connect nodes and nodes are associated with sensor data that was captured contemporaneously with the creation of each respective node; tag an object for tracking within the spatial graph or an object graph associated with the spatial graph; query sensors accessible by the computing device to capture a blueprint of current sensor data, wherein the sensors include sensors of a different type; and associate the object with a most recently created node and the node's sensor data.

In another example, the instructions further cause the computing device to: create additional nodes as a wearable device navigates a physical area; detect a new location for the object using the sensor data for the created nodes; and upon detecting the new location for the object, delete the association from the object to the previous node, and creating a new association between the object to the new node. In another example, the instructions further cause the computing device to expire stale nodes within the spatial graph, in which stale nodes are those that are old with respect to time or contain irrelevant sensor data. In another example, the instructions further cause the computing device to receive a request for a location of the object; and using blueprints of sensor data for nodes within the spatial graph, provide directions for traversing nodes within the spatial graph which lead to the object.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A computing device configured to collect and synthesize sensory data to track objects, comprising:
   one or more processors;
   memory configured to store a spatial graph and the sensory data which is associated with nodes in the spatial graph, the memory having computer-readable instructions which, when executed by the one or more processors, cause the computing device to:
   receive a first set of sensory data in which the first set includes multiple sensory graphs, each associated with distinct sensory information;
   create a first node in the spatial graph; and
   associate the first set of sensory data with the first node.

2. The computing device of claim 1, in which the computer-readable instructions further cause the computing device to:
   receive a subsequent set of sensory data;
   create a subsequent node in the spatial graph;
   associate the subsequent set of sensory data with the subsequent node; and
   create an edge in the spatial graph which links the first node to the subsequent node, in which the first node becomes a pre-existing node to the subsequent node.

3. The computing device of claim 2, in which the computer-readable instructions further cause the computing device to:
   create a series of nodes and edges to create a spatial print chain;
   locate an object based on sensory data associated with one or more nodes in the series of nodes; and
   create directions for a user to traverse the edges and nodes within the spatial print chain, wherein the directions lead the user to the object,
   in which current sensory data and previous sensory data associated with nodes are used to create the directions.

4. The computing device of claim 2, in which the sets of sensory data are received when one or more measurements in the sensory graphs pass a threshold.

5. The computing device of claim 4, in which when at least one of the measurements in the sensory graphs pass the threshold, each sensory device is queried to generate the sensory data for a new node.

6. The computing device of claim 1, in which the sensory data is received from a user's computing device or an edge compute unit configured to store the nodes and sensory data for one or more wearable devices.

7. The computing device of claim 1, in which the computer-readable instructions further cause the computing device to:
   communicate with an external context provider which provides additional context and sensory information for a physical environment, in which the context or sensory information at least includes maps for the physical environment, an amount of people occupying a space, scheduling events within the physical environment, details about rooms in the physical environment, or sensory information to be associated with the nodes.

8. The computing device of claim 1, in which the computer-readable instructions further cause the computing device to:
   construct spatial print chains using a collection of nodes and edges connecting the nodes, in which each spatial print chain is comprised of its own respective collection of nodes and edges; and
   connect two different spatial print chains to form one single spatial print chain.

9. The computing device of claim 8, in which the two different spatial print chains are connected when an offline computing device establishes an internet connection and transmits the spatial print chain to the computing device.

10. The computing device of claim 8, in which the two different spatial print chains are connected when both chains share a relationship to each other.

11. A method performed by a local computing device within a physical environment to generate sensory data for a spatial graph, comprising:
   assigning threshold levels for the sensory data developed by each sensory device associated with the local computing device;
   monitoring a state of the sensory data associated with each sensory device;
   when one or more of the assigned threshold levels associated with respective sensory devices is surpassed according to the state monitoring, triggering a state log for each of the sensory devices where the local computing device constructs a sensor graph based on current sensory data for each sensory device; and gather each of the constructed sensor graphs into a spatial graph, in which the spatial graph assigns the state logs for the sensory devices to a node in the spatial graph.

12. The method of claim 11, in which the assigned threshold levels for each sensory device represent a change in sensor state.

13. The method of claim 11, in which the sensory devices include at least one of a global positioning system (GPS), Wi-Fi, Bluetooth®, camera, thermometer, magnetometer, pedometer, accelerometer, gyroscope, inertial measurement unit (IMU), microphone, proximity sensor, barometer, or light sensor.

14. The method of claim 11, further comprising:
receiving, at a user interface (UI) of the local computing device, input to tag an object using the spatial graph; and
responsive to the received input, querying the sensory devices for sensor data associated with the tagged object to generate a blueprint of data for the tagged object.

15. The method of claim 14, further comprising:
receiving a subsequent input to locate the tagged object;
locating indications at one or more nodes within the spatial graph that represent the tagged object; and
outputting on the UI the one or more nodes or locations associated with the one or more nodes of the located indications.

16. The method of claim 15, in which the indications include correspondences between original sensor data from when the object was tagged and subsequent data within the spatial graph.

17. One or more hardware-based computer-readable memory devices storing instructions which, when executed by one or more processors disposed in a computing device, cause the computing device to:
establish a series of nodes and edges within a spatial graph, in which edges connect nodes and nodes are associated with sensor data that was captured contemporaneously with the creation of each respective node;
tag an object for tracking within the spatial graph or an object graph associated with the spatial graph;
query sensors accessible by the computing device to capture a blueprint of current sensor data, wherein the sensors include sensors of a different type; and
associate the object with a most recently created node and the node's sensor data.

18. The one or more hardware-based computer-readable memory devices of claim 17, in which the instructions further cause the computing device to:
create additional nodes as a wearable device navigates a physical area;
detect a new location for the object using the sensor data for the created nodes; and
upon detecting the new location for the object, delete the association from the object to a previous node, and create a new association between the object to the new node.

19. The one or more hardware-based computer-readable memory devices of claim 17, in which the instructions further cause the computing device to expire stale nodes within the spatial graph, in which stale nodes are those that are old with respect to time or contain irrelevant sensor data.

20. The one or more hardware-based computer-readable memory devices of claim 17, in which the instructions further cause the computing device to:
receive a request for a location of the object; and
using blueprints of sensor data for nodes within the spatial graph, provide directions for traversing nodes within the spatial graph which lead to the object.

* * * * *